United States Patent

Faulbecker

[11] 4,276,759
[45] Jul. 7, 1981

[54] CENTERED DOUBLE JOINT

[75] Inventor: Gerd Faulbecker, Essen, Fed. Rep. of Germany

[73] Assignee: Gelenkwellenbau GmbH, Essen, Fed. Rep. of Germany

[21] Appl. No.: 59,148

[22] Filed: Jul. 20, 1979

[30] Foreign Application Priority Data

Jul. 28, 1978 [DE] Fed. Rep. of Germany ....... 2833149

[51] Int. Cl.³ ............................................. F16D 3/26
[52] U.S. Cl. ...................... 64/17 R; 64/21; 277/212 FB; 277/181
[58] Field of Search ............ 64/17 R, 21, 7, 32 F; 277/212 FB, 166, 178, 186, 189, 181–184; 74/18, 18.1, 18.2

[56] References Cited

U.S. PATENT DOCUMENTS

| 2,067,286 | 1/1937 | Pearce | 64/21 |
| 2,947,158 | 8/1960 | King | 64/21 |
| 3,029,618 | 4/1962 | Bouchard et al. | 64/21 |
| 3,095,715 | 7/1963 | Stokely | 64/21 |
| 3,747,368 | 7/1973 | Morin | 64/21 |

FOREIGN PATENT DOCUMENTS

| 637176 | 10/1936 | Fed. Rep. of Germany | 64/21 |
| 1235549 | 5/1959 | France | 64/21 |
| 606460 | of 1960 | Italy | 64/17 R |

Primary Examiner—Ira S. Lazarus
Assistant Examiner—Magdalen Moy

[57] ABSTRACT

In a centered double joint, a centering device interconnects a first single joint to a second single joint. The centering device includes a pin extending axially outwardly from one of the single joints. An intermediate element is fitted onto and laterally encircles the pin with its radially outer surface fitted into the interior of a journal extending axially outwardly from the other single joint. A gasket laterally encircles an axially extending portion of the pin and of the journal and is in sealed engagement with each of them. A shaped reinforcing ring is tightly attached to the end of the gasket secured to the pin and seats against the adjacent end face of the intermediate element.

10 Claims, 7 Drawing Figures

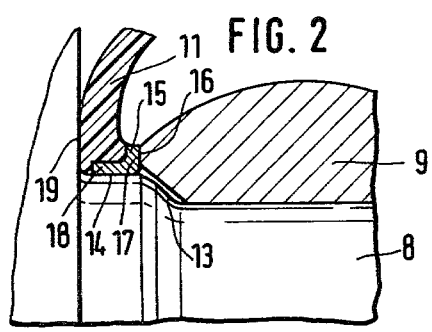
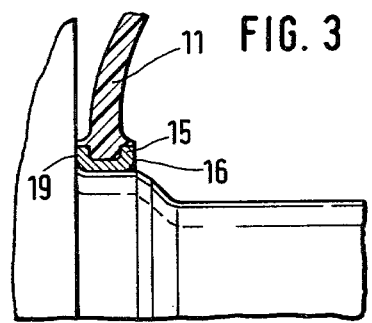
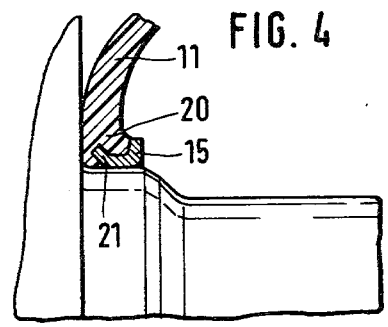
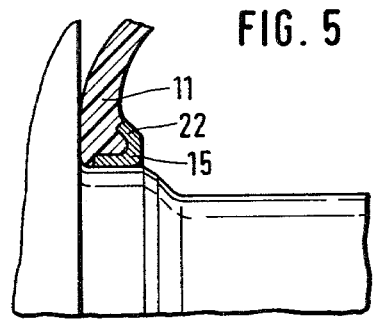
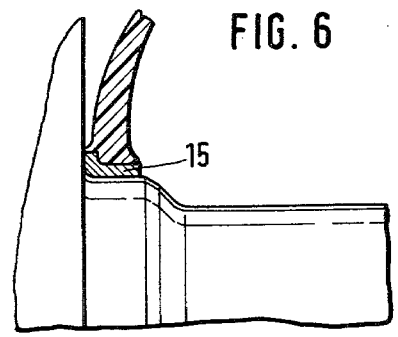
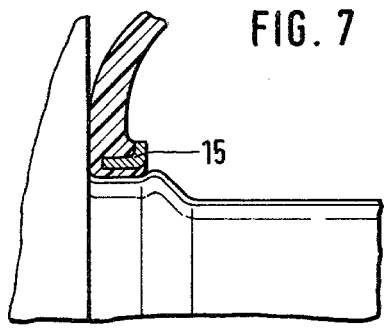

CENTERED DOUBLE JOINT

SUMMARY OF THE INVENTION

The present invention is directed to a centered double joint formed of two single joints each of which perform about half of the total bending angle of the double joint. Centering means interconnect the two single joints and includes a pin extending axially outwardly from one of the joints toward the other. An intermediate element laterally encircles and is fitted onto the pin and, in turn, fits into a journal extending axially outwardly from the other single joint. The intermediate element has a radially outer guide surface in contact with a complementary inner surface of the journal. A gasket covers an axially extending portion of the pin and of the journal and is tightly fitted onto each of them. The smaller diameter end of the gasket is secured onto the pin while its larger diameter end is secured onto the journal.

In double joints, for instance in German Offenlegungsshrift No. 2 144 467, damage often develops in the centering bearing. Such damage frequently is caused by the gasket slipping off its attachment location in the joint and results in the loss of lubricant in the centering element and, finally, in failure of the entire joint. There has been a particularly high portion of failures in vehicles with collapsible steering wheels, since the stress is especially high in a rough ride.

Another disadvantageous feature of this known gasket is that it is difficult to assemble, because after the joint is completely assembled the gasket must be positioned from the outside using a wire hook or similar means. With such means, the gasket must be pulled from the outside onto its fastening seat through openings between the cross pin assembly and the single joint parts. Mistakes are often made in the assembly operation which lead to the failure of the joint, with the centering element failing due to lack of lubricant.

In another known double joint, note German Pat. No. 1,175,495, there is the disadvantage that the assembly of the gasket is very elaborate and difficult with the result that mistakes in the assembly of the gasket often occur in this double joint. Moreover, the manufacture of these centering pins in one piece is very expensive and difficult, since the spherical guide surface must be integral with the joint part.

Therefore, in view of the problems and difficulties experienced in the past, the primary object of the present invention is to provide a seal for the centering bearing in a double joint where adequate securement of the gasket is ensured even under difficult operating conditions. In addition, the invention affords a simple and problem-free method of assembling the gasket in the double joint.

In accordance with the present invention, the gasket is provided with a reinforcing ring tightly secured to its smaller diameter end with the ring fitted onto a part of the pin and with an annular stop face on the ring seated against and having a diameter corresponding substantially to the diameter of the adjacent end face on the intermediate element. The reinforcing ring fits onto an increased diameter part of the pin. A frusto-conical portion of the pin extends from the increased diameter part to the smaller diameter part located within the intermediate element and extending toward the other joint part.

It is advantageous that the gasket can be secured to the other joint in a known manner on a surface which has a larger diameter than the surface of the pin to which the gasket is fastened. The smaller diameter end of the gasket, which is more difficult to fasten, is vulcanized onto the reinforcing ring and the ring is held on a stepped portion of the pin especially provided for that purpose. The reinforcing ring is secured on the pin by means of a press fit. It is no longer possible for the gasket to slip, because the reinforcing ring is smaller in diameter than the adjacent end face of the intermediate element which provides a stop for the ring. To prevent the intermediate element from damaging the elastic gasket, the reinforcing ring is provided with a right angle axially extending cross-section with the radially inner part of the right angle cross-section forming a leg fitted onto the stepped portion of the pin while the other leg extending radially outwardly forms a stop which seats against the adjacent end face of the intermediate element.

In another embodiment of the invention, the reinforcing ring is provided with a U-shaped axially extending cross-section. In other words, the radially outwardly extending portions of the U-shaped cross-section prevent damage to the elastic gasket not only by intermediate element but also by the pin on the opposite side of the gasket from the intermediate element. Moreover, an especially firm bond is provided between the end of the gasket and the reinforcing ring during vulvanization.

In other embodiments of the invention a good fastening is provided between the gasket and the reinforcing ring by shaping radially outwardly extending parts of the reinforcing ring. In one arrangement, the outwardly extending part of the ring in contact with the intermediate element is provided with a shoulder which extends outwardly from the end face of the intermediate ring and extends into the end of the gasket. In another arrangement, a radially outwardly extending part of the reinforcing ring which seats on the pin extends into the gasket. In these various embodiments, a portion of the reinforcing ring extends into the end of the gasket so that a more complete bonding action is provided between the ring and the gasket.

In the method of assembling the centered double joint, the gasket as described above and embodying the present invention, has its larger diameter end secured to the journal extending from one of the single joints. Next, the pin is introduced through the smaller diameter end of the gasket into the intermediate element located within the journal. Then the end of the gasket including the reinforcing ring is pressed via the intermediate element onto the increased diameter surface of the pin formed on the other single joint.

It is advantageous that the gasket can be fixed at its larger diameter end onto the journal before the remaining parts of the centering device are assembled. After the assembly of the cross pin links and the joint forks, the gasket is centered with its smaller diameter end being pressed onto the pin as the intermediate element rides against the frusto-conically shaped portion of the pin adjacent its increased diameter portion. The pressing action provided by the intermediate element seats the reinforcing ring onto the pin. A press fit of the reinforcing ring onto the pin is provided assuring an adequate locking and sealing of the centering bearing.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 2 is an enlarged view of a portion of the centering arrangement as illustrated in FIG. 1 showing the end of the gasket fitted onto the stepped portion of the pin; and FIGS. 3–7 are views similar to FIG. 2 and illustrating alternate embodiments of the reinforcing ring shown in FIG. 2.

DETAILED DESCRIPTION OF THE INVENTION

Figure 1:
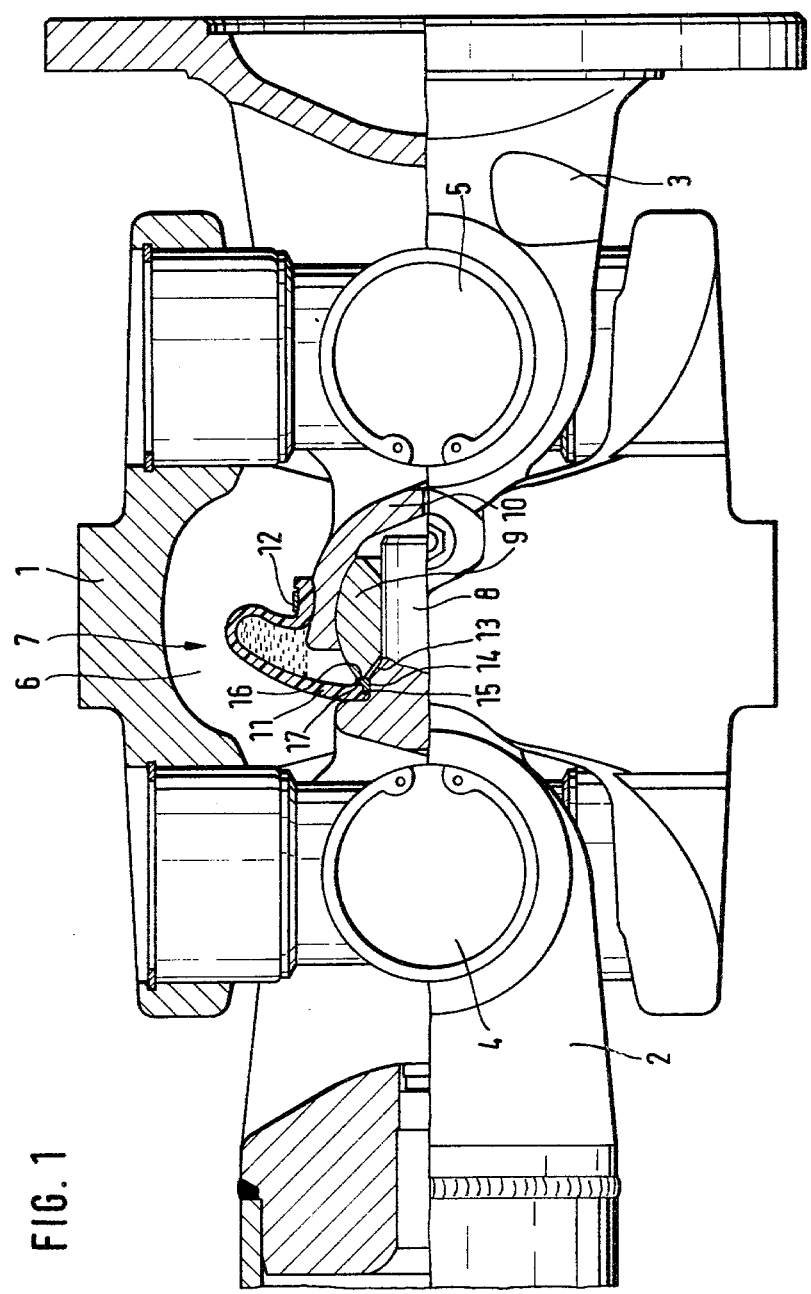
FIG. 1 is a view, partly in section, of a centered double joint embodying the present invention.

In FIG. 1 a centered double joint is illustrated consisting of a catch ring 1 and two outer joint forks 2 and 3 joined to one another by two cross-links 4 and 5. In the space 6 within catch ring 1 a centering bearing 7 is located. Centering bearing 6 includes a pin 8 extending axially from the inwardly directed arm of the joint fork 2. An intermediate element 9 with a cylindrical bore extends laterally around the end portion of the pin closer to the joint fork 3. The intermediate element 9 has a spherically shaped radially outer surface which fits in contact with a complementary shaped inner surface of a journal 10 extending axially outwardly from the joint fork 3. Intermediate element 9 is mounted for axial displacement on pin 8 and for rotational movement within the journal 10 of the joint fork 3. This arrangement of the centering bearing 7 ensures that, when the joint is bent, the single joints each perform half of the bending angle. To reduce friction, intermediate element 9 is supplied with lubricant and leakage of the lubricant is prevented by a gasket 11. The gasket extends over an axially extending part of the journal 10 and of the pin 8. At its larger diameter end, gasket 11 is secured on the outer surface of journal 10 by a safety element 12, such as a band clip. The pin 8 has a cylindrically shaped portion fitted into the intermediate element 9 and this cylindrical portion ends in a frusto-conically shaped portion 13 which tapers outwardly away from the free end of the pin 8 toward the joint fork 2. Extending axially from the larger diameter end of the frusto-conically shaped portion 13 is a cylindrically shaped portion 14 having an outside diameter greater than the diameter of the portion of the pin 8 extending through the intermediate element. The cylindrically shaped portion 14 provides a step on which a reinforcing ring 15 is seated by a press fit. The reinforcing ring is bonded with the smaller diameter end of the gasket 11, such as by vulcanization. As can be seen better in FIG. 2, reinforcing ring 15 has a right-angle cross section, that is, the cross section extending in the axial direction of the pin 8, with one leg of the right-angle cross section forming a cylindrically shaped part fitted onto the step or cylindrically shaped portion 14 of the pin and a flange-like part extending radially outwardly from the surface of the pin, transversely of the axis thereof, and forming a stop face 16 providing an annular surface whose radially outer diameter corresponds substantially to the radially outer diameter of the juxtaposed end face 17 of intermediate element 9. The end face 17 also extends transversely of the axis of the pin 8.

After the intermediate element 9 is assembled into the interior of the journal 10 with its radially outer surface in contact with the inner surface of the journal, the larger diameter end of the gasket 11 is fastened onto the outer surface of the journal 10. The joint fork 3 is introduced into the catch ring 1 with the intermediate element 9 sliding axially over the smaller diameter free end of pin 8. As a result, the smaller diameter end of the gasket mounted on the journal 10 moves over the axially extending surface of the pin 8, moving past the frusto-conically shaped portion 13 of the pin, with the reinforcing ring 15 being press fit onto the cylindrically shaped portion 14 of the pin. As the intermediate element 9 moves into position on the pin, it presses the reinforcing ring and the gasket onto the portion 14 of the pin. As can be seen in FIGS. 1 and 2, the inner surface of the intermediate element 9 has a frusto-conical surface similar to the surface of the frusto-conical portion 13 on the pin.

In FIG. 2 the frusto-conical portion 13 and the step or cylindrically shaped portion 14 of the pin 8 are shown on an enlarged scale. Gasket 11 is bonded directly to the reinforcing ring 15 and seals the centering bearing against the joint fork 2. Reinforcing ring 15 has a cylindrically shaped axially extending leg 18 which is press fit onto the cylindrically shaped portion 14 of the pin and a second leg disposed perpendicularly to the leg 18 extends radially outwardly from the pin and forms the stop 16 which bears against the end face 17 of the intermediate element 9.

In FIG. 3 another embodiment of the reinforcing ring 15 is illustrated in which the ring has a U-shaped axially extending cross section as compared to the L-shape shown in FIG. 2. In FIG. 2 the surface of the gasket at its smaller diameter end bears directly against a surface 19 on the pin 8 at the end of the cylindrically shaped portion 14 more remote from the free end of the pin. In FIG. 3, however, the other leg of the U-shaped reinforcing ring bears against the surface 19.

The embodiment in FIG. 3 can be extended so that the fastening of the gasket 11 is afforded without any auxiliary means, with the end of the gasket being clamped in the U-shaped reinforcing ring 15.

Another arrangement for securely interengaging the reinforcing ring 15 and the gasket 11 is shown in FIG. 4 where the end of the cylindrically shaped portion of the reinforcing ring, seated on the cylindrically shaped portion 14 of the pin, has an outwardly extending projection or shoulder 21 which extends into the end 20 of the gasket. This arrangement increases the vulcanization surface and any difficulties in achieving a bond between the gasket and the reinforcing ring can be avoided to a great extent.

In FIG. 5 still another embodiment of the reinforcing ring 15 is shown similar to that in FIG. 2, however, a projection is provided on the radially outer end of the transversely extending leg of the ring which provides a shoulder 22 extending into the gasket 11 whereby a form locking interconnecting of the ring and gasket is afforded after the ring has been pressed into the gasket.

Two additional embodiments of the reinforcing ring 15 are shown in FIGS. 6 and 7 which assure the adequate interengagement of the gasket and the reinforcing ring. In FIG. 6 the right-angle portion of the reinforcing ring is located at the end of the cylindrically shaped portion 14 of the pin more remote from the free end of the pin. In FIG. 7 the cylindrically shaped leg of the reinforcing ring is spaced closely outwardly from the cylindrically shaped portion 14 of the pin.

While specific embodiments of the invention have been shown and described in detail to illustrate the application of the inventive principles, it will be understood that the invention may be embodied otherwise without departing from such principles.

What is claimed is:

1. Centered double joint comprising a first single joint, a second single joint, and centering means interconnecting said first and second joints, said centering means comprising a pin secured to and extending axially outwardly from said first single joint toward said second single joint, an intermediate element fitted on and laterally encircling said pin, said intermediate element having a first end located closer to said first single joint and a second end located closer to said second single joint, a journal fixed to said second single joint and extending outwardly therefrom toward said first single joint, said intermediate element located within said journal with the outer surface of said intermediate element disposed in contact with a complementary shaped surface in the interior of said journal, and a gasket laterally enclosing at least an axially extending portion of said pin and said journal, said gasket extending in the axial direction of said pin and having a first end and a second end with the first end secured to said pin and the second end secured to said journal, first means for securing the first end of said gasket to said pin, and second means for securing the second end of said gasket to said journal, wherein the improvement comprises that said first means comprises a reinforcing ring bonded to said gasket at the first end thereof, said reinforcing ring having a first cylindrical part extending in generally parallel relation with the axis of said pin and said first part having a first end spaced from said intermediate element and a second end adjacent the first end of said intermediate element, the second end of said first part forming a stop face extending transversely of the axis of said pin and disposed in surface contact with the transversely extending surface at the first end of said intermediate element, said pin having a first axially extending cylindrical portion fitted into said intermediate element, and a second axially extending cylindrical portion located closer to said first single joint, said second cylindrical portion having a larger diameter than said first portion, and said first cylindrical part of said reinforcing ring is press fit onto said cylindrical portion of said pin.

2. Centered double joint, as set forth in claim 1, wherein said reinforcing ring having a second flange-like part extending radially outwardly from the second end of said first part transversely of the axis of said pin, the surface of said second flange like part facing said intermediate element forming said stop face disposed in surface contact with the transversely extending surface at the first end of said intermediate element, and the radially outer diameter of said second part corresponds approximately to the radially outer diameter of the transversely extending surface at the first end of said intermediate element.

3. Centered double joint, as set forth in claim 2, wherein said first end of said gasket secured to said pin has a smaller diameter than the second end of said gasket secured to said journal.

4. Centered double joint, as set forth in claim 3, wherein said pin has an axially extending frusto-conically shaped portion extending between the adjacent ends of said first and second cylindrically shaped portions and the end of the inner surface of said intermediate element closer to said first single joint being frusto-conically shaped and disposed in juxtaposition to said frusto-conically shaped portion of said pin.

5. Centered double joint, as set forth in claim 1, wherein said reinforcing ring is vulcanized to said gasket.

6. Centered double joint, as set forth in claim 2, wherein in axially extending cross section said first cylindrical part and said second flange part of said reinforcing ring form a right-angle section.

7. Centered double joint, as set forth in claim 2, wherein in axially extending cross section, said reinforcing ring is U-shaped with a third flange part located at the opposite end of said first cylindrical part from said second flange part and with said third flange part extending radially outwardly in generally parallel relation with said second flange part.

8. Centered double joint, as set forth in claim 2, wherein said first cylindrical part has a radially outwardly projecting shoulder extending into said gasket.

9. Centered double joint, as set forth in claim 2, wherein said second flange part has a projection therefrom spaced radially outwardly from said first cylindrical part with said projection extending into said gasket.

10. Method of assembling a centered double joint including a first single joint, a second single joint, centering means interconnecting the first and second joints and including a pin secured to and extending axially outwardly from the first single joint toward the second single joint, an intermediate element fitted on and laterally encircling the pin, the intermediate element having a first end located closer to the first single joint and a second end located closer to the second single joint, a journal fixed to the second single joint and extending outwardly therefrom toward the first single joint, the intermediate element located within the journal with the outer surface of the intermediate element disposed in contact with a complementary shaped surface in the interior of the journal, a gasket laterally enclosing at least an axially extending portion of the pin and the journal, the gasket extending in the axial direction of the pin and having a first end and a second end, a reinforcing ring being bonded to the gasket at the first end thereof, with the reinforcing ring having a first cylindrical part extending in generally parallel relation with the axis of the pin, comprising the steps of fastening the larger diameter end of the gasket onto the outer surface of the journal, inserting the end of the pin spaced outwardly from the first single joint through the smaller diameter end of the gasket into the intermediate element with the intermediate element extending axially along the pin toward the first joint member and moving the transverse end surface at the first end of the intermediate element into contact with a transverse end surface of the reinforcing ring and pressing the reinforcing ring into a press fit engagement with the surface of the pin spaced axially from the surface of the pin in contact with the inner surface of the intermediate element.

* * * * *